(12) United States Patent
Huser

(10) Patent No.: US 8,142,262 B2
(45) Date of Patent: Mar. 27, 2012

(54) SANDING DEVICE WITH DETACHABLY MOUNTED SANDING ELEMENT

(75) Inventor: Werner Huser, Leinfelden-Echterdingen (DE)

(73) Assignee: Robert Bosch GmbH, Stuttgart (DE)

( * ) Notice: Subject to any disclaimer, the term of this patent is extended or adjusted under 35 U.S.C. 154(b) by 716 days.

(21) Appl. No.: 12/296,551

(22) PCT Filed: Sep. 6, 2007

(86) PCT No.: PCT/EP2007/059346

§ 371 (c)(1),
(2), (4) Date: Oct. 9, 2008

(87) PCT Pub. No.: WO2008/040612

PCT Pub. Date: Apr. 10, 2008

(65) Prior Publication Data

US 2009/0170412 A1 Jul. 2, 2009

(30) Foreign Application Priority Data

Oct. 5, 2006 (DE) .......................... 10 2006 047 139

(51) Int. Cl.
*B24B 23/00* (2006.01)

(52) U.S. Cl. ........ 451/344; 451/353; 451/490; 451/538; 24/452

(58) Field of Classification Search ................... 451/344, 451/353, 490, 538; 24/452, 442, 450, 306, 24/445 X
See application file for complete search history.

(56) References Cited

U.S. PATENT DOCUMENTS

| | | | | |
|---|---|---|---|---|
| 3,101,517 A * | 8/1963 | Fox et al. | ......................... | 24/442 |
| 3,266,113 A | 8/1966 | Flanagan | | |
| 3,408,705 A * | 11/1968 | Kayser et al. | ................... | 24/452 |
| 3,557,413 A * | 1/1971 | Engle | .......................... | 24/584.1 |
| 3,703,739 A * | 11/1972 | Young et al. | ................ | 15/230.17 |
| 4,846,821 A * | 7/1989 | Lyons et al. | ................... | 604/369 |
| 4,946,527 A * | 8/1990 | Battrell | ............................ | 156/60 |
| 5,097,570 A * | 3/1992 | Gershenson | .................... | 24/452 |
| 6,076,238 A * | 6/2000 | Arsenault et al. | ............... | 24/452 |
| 6,124,015 A * | 9/2000 | Baker et al. | ...................... | 428/99 |
| 6,589,638 B1 | 7/2003 | McCormack et al. | | |
| 6,687,962 B2 | 2/2004 | Clarner et al. | | |
| 7,007,351 B2 * | 3/2006 | Ausen et al. | .................... | 24/452 |
| 2003/0188456 A1 | 10/2003 | Giordano | | |

FOREIGN PATENT DOCUMENTS

| | | |
|---|---|---|
| CN | 1096335 | 12/1994 |
| CN | 1096335 | 12/2002 |
| CN | 1 617 682 | 5/2005 |
| CN | 1617682 | 5/2005 |
| RU | 2 196 047 | 1/2003 |
| RU | 2 261 032 | 9/2005 |
| WO | 95/19242 | 7/1995 |
| WO | 01/58302 | 8/2001 |
| WO | 03/061422 | 7/2003 |

* cited by examiner

*Primary Examiner* — George Nguyen
(74) *Attorney, Agent, or Firm* — Michael J. Striker

(57) ABSTRACT

The invention relates to a grinding device, comprising a mounting body which is detachably connected to a grinding element, said detachable connection being designed such that the mounting body has a first adhering arrangement and the grinding element has a second adhering element and the adhering elements correspond in the manner of a Velcro fastener. The aim of the invention is to improve the quality and efficiency of the detachable connection for exchange of the grinding element of the claimed grinding device. Said aim is achieved, wherein the first adhering element (1) and the second adhering element (2) comprise a number of projections (3) each with a cross-sectional widening in the direction of the free end (7) of the projection (3).

10 Claims, 1 Drawing Sheet

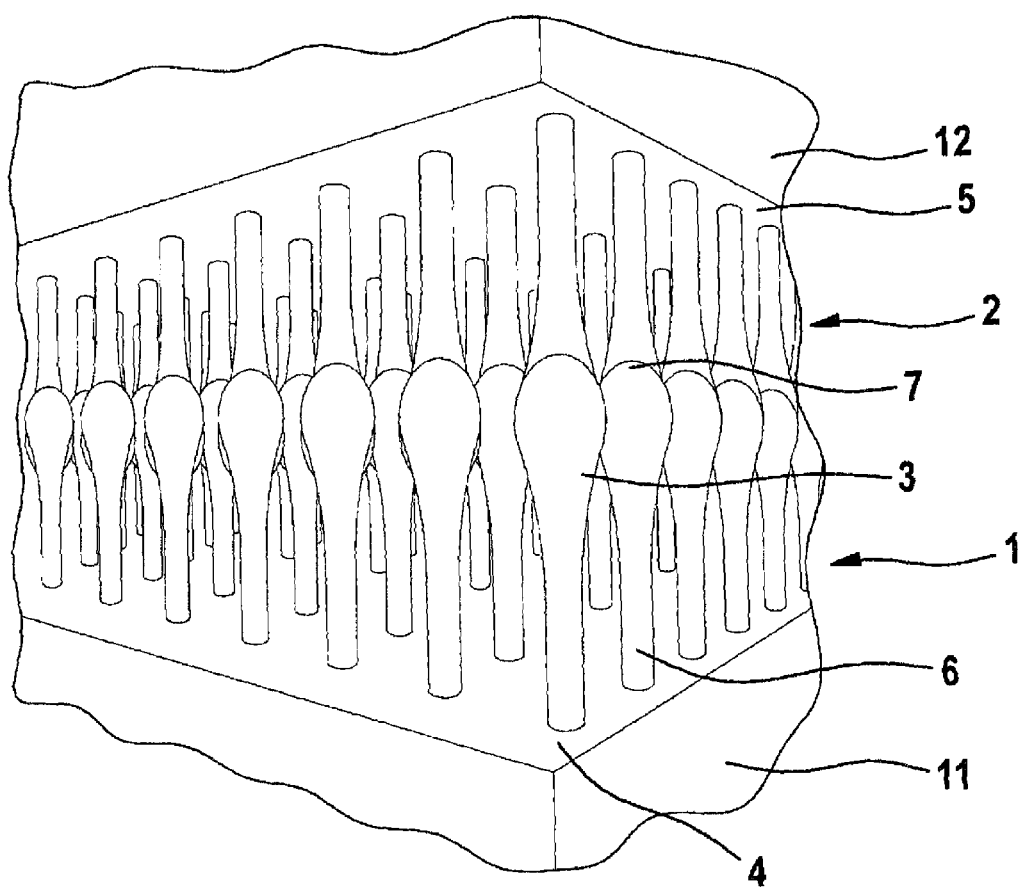

SANDING DEVICE WITH DETACHABLY MOUNTED SANDING ELEMENT

RELATED ART

The present invention relates to a sanding device with a receiving body that is detachably connected with a sanding element, the detachable connection being designed such that the receiving body includes a first adhesive element and the sanding element includes a second adhesive element, the adhesive elements corresponding with each other in the manner of a Velcro fastener Various sanding devices are known within the field of sanding engineering that utilize replaceable sanding elements, in particular sanding pads, e.g., hand-held power tools such as the delta sander, finishing sander, or the external sander. In order to replace sanding pads—which become worn quickly—with sanding pads with new sanding material in an uncomplicated, rapid manner, paired adhesive elements are used, one adhesive element being located on the top side of the receiving body—which is designed, e.g., as a sanding disk—and the other adhesive element being located on the underside of the sanding pad, the paired adhesive elements being designed in the manner of a flat Velcro fastener and resulting in an easily detachable connection. The pair of adhesive elements of the Velcro fastener known from the related art includes surface structures with many different shapes. One of the two adhesive surfaces is composed of a material with a large number of hooks, similar to a burr, while the other adhesive surface is made of a woolly material with a large number of loops. When the pair of adhesive surfaces is used on the sanding device, the adhesive surface with the soft loop material is preferably located on the underside of the sanding pad, while the somewhat stiffer adhesive surface with the hooks is usually assigned to the receiving body. When the adhesive surfaces are pressed together, the small hooks on one adhesive surface interlock—quasi micromechanically—with the loops of the other adhesive surface, thereby resulting in the adhesion force of the Velcro connection. Depending on the type of materials of which the adhesive surfaces are made, and depending on the number of hooks and loops, a connection results that is adhesive to varying degrees but is still detachable. The adhesive surfaces of the Velcro connection may be detached from each other by applying more or less force, accompanied by the characteristic noise of their being separated.

These known Velcro connections have the disadvantage that they wear relatively quickly when they are used often. Tearing the hooks out of the loops when separating the connection soon results in the small hooks becoming tangled and the loops becoming damaged and torn open. In addition, sanding particles that are produced may contribute to the contamination of the adhesive surfaces. As a result, the connection loses its original adhesive strength and becomes increasingly weaker. This takes place to an even greater extent with the adhesive element located on the receiving body, which is reused more often with the sanding device. Replacing this adhesive surface, which is usually fixedly bonded with the sanding disk of the receiving body, results in high repair costs.

In addition, due to the differentiated surface structures of the two adhesive elements, the Velcro connection requires different types of materials and manufacturing processes, which make production complicated and expensive.

Finally, the noise produced when the Velcro connection is separated is often perceived as being disturbing.

The conventional Velcro connection—in particular in its application for sanding devices with consumable materials that must be replaced often, such as sanding pads—therefore requires improvement in a both a technical and economic sense.

The object of the present invention, therefore, is to improve the quality and effectiveness of the detachable connection for replacing the sanding element of the generic sanding device.

DISCLOSURE OF THE INVENTION

This object is attained by the fact that, with the detachable connection between the receiving body and the sanding element, the first adhesive element and the second adhesive element include a large number of projections, the cross section of each widens toward the free end of the projection.

With this type of surface structure of the two adhesive elements, when they are joined, the projections mesh with each other from opposite directions and form a reach-behind connection. Due to the adhesive structure, which is shaped, e.g., as a droplet or a club, the opening and closing of the connection is silent, and the adhesive elements develop no signs of wear and tear. Any dirt produced, e.g., sanding dust, may penetrate the spaces between the projections without interfering with the form-fit connection. The inventive detachable connection with this type of system is therefore very low-wear, while ensuring a good, solid connection even under intensive use. Due to the shape of the projections, the novel connection system may absorb high shear forces while remaining easy to disconnect. The two adhesive elements also have the same surface structure, thereby simplifying the manufacture of the connection system significantly and making it much more cost-effective.

In all, a detachable connection of this type is more convenient, efficient, and low-cost to manufacture than conventional Velcro connections. This detachable connection is therefore a good option for use with a sanding device that uses replaceable sanding elements.

Due to the measures listed in the subclaims, advantageous refinements and improvements of the inventive sanding device described in claim 1 are made possible.

Particularly good adhesion results are obtained, e.g., when the shape and/or distance between the projections within a surface structure of an adhesive element are not random in design, but rather are designed to match and are uniform. The adhesion quality increases that much more when these design factors of the projections are provided on both adhesive elements in a matching manner. In addition, when the adhesive elements are entirely identical and the two adhesive elements are made of the same materials, the production costs to manufacture the connection system is reduced to a minimum, since the need to manufacture two different adhesive elements is eliminated entirely.

The size, shape, separation, and/or materials of the projections may also be varied, provided that the detachable reach-behind connection is always ensured. As a result, the adhesive properties of the adhesive elements may be adapted very precisely to the highly diverse application and load conditions of the detachable connection on many types of sanding devices.

In a further advantageous embodiment, the first adhesive element is detachably connected with the receiving body. The first adhesive element assigned to the receiving body is therefore not fixedly bonded with it, but rather is detachably connected therewith. It is therefore possible—as part of the continual replacement of the sanding elements—to easily replace the adhesive element that is mechanically loaded most often.

Another feature of an advantageous embodiment is the fact that the receiving body includes a sanding disk on which the first adhesive element is formed. The sanding disk serves to dampen the mechanical loads that occur during sanding, in particular the vibrations that are transmitted from the object being worked to the sanding device, and is therefore usually made of hard rubber or a similar elastic material. This material is also suited for use to form the projections of the adhesive element, since an elasticity of the projections of the inventive detachable connection between the adhesive elements makes it easier to connect and disconnect the two adhesive elements. It is therefore favorable to manufacture the first adhesive element and the sanding pad using the same material, while manufacturing them out of a single piece results in even more technological advantages.

If the sanding pad is detachably connected with a main body of the receiving body, it is also possible to easily replace the sanding pad, which is subject to a certain amount of wear—particularly on its edge regions—due to the sanding work. It is therefore possible to use sanding pads with different degrees of elasticity for special applications.

If the detachable connection of the sanding pad with the main body is formed by the fact that the main body includes a third adhesive element that is similar to the first adhesive element, and the sanding pad includes a fourth adhesive element that is similar to a second adhesive element, the inventive detachable connection system may also be used to attach the sanding pad to the main body. Since the form-fit connection of the inventive connection system produces good holding forces, this type of connection is also suitable for use in place of the sanding device on which the requirements on the holding force increase, e.g., due to greater leverage.

BRIEF DESCRIPTION OF THE DRAWING

A sanding device with the inventive detachable connection between a receiving body and a sanding element is described in greater detail below with reference to an exemplary embodiment. The associated drawing shows, in FIG. 1, a schematic, greatly enlarged illustration of the detachable connection between a receiving body and a sanding element.

EMBODIMENT(S) OF THE INVENTION

FIG. 1 shows, in a greatly enlarged sectional view, the surface structure of meshing adhesive elements of the receiving body and the sanding element. A first adhesive element 1, which is connected with the top side of a receiving body 11 of the sanding device (which is implied in the illustration), is engaged with a second adhesive element 2, which is located on the back side of replaceable sanding element 12, e.g., a sanding pad (which is implied in the illustration). First adhesive element 1 and second adhesive element 2 include a large number of identically shaped and sized projections 3, which are uniformly distributed and extend out of base 4, 5 of adhesive elements 1, 2. Projections 3 are shaped like clubs, and the cross section of each projection 3 expands essentially continually from its shank 6 toward its free end 7. Projections 3 are only a few tenths of a millimeter in size. When first adhesive element 1 and second adhesive element 2 are joined, projections 3 slide into each other from opposite directions and enclose each other. When adhesive elements 1 and 2 are joined, one projection of one element extends between projections on the other element, and vice versa. The free end regions of projections 3 are designed as oblique contact surfaces and therefore facilitate the joining process. As the two elements are pressed further together, the projections of the two adhesive elements 1 and 2 come to lie side-by-side. When the adhesive elements are pressed even further together, projections 3 of the two adhesive elements 1 and 2 reach behind each other, since a region with a smaller diameter adjoins the region with the larger diameter, due to the club shape. The head shape of projections 3 with the expanding cross section therefore ensures that projections 3 may be joined easily, and the shape with the decreasing cross section that adjoins the largest diameter provides the necessary reach-behind effect of the connection. This type of three-dimensional design of the two adhesive elements 1, 2 has the advantageous properties described above, which result in a qualitative improvement of the detachable connection between receiving body 11 and sanding element 12 of the sanding device.

What is claimed is:

1. A sanding device with a receiving body that is detachably connected with a sanding element, the detachable connection designed such that the receiving body includes a first adhesive element and the sanding element includes a second adhesive element, the adhesive elements corresponding with each other in the manner of a Velcro fastener, wherein the first adhesive element and the second adhesive element include a large number of projections, and wherein each projection comprises a shank portion having a cylindrical shape which is first narrow and then widens in an axial direction towards the projection's free end to form a head in a shape of a droplet or club and wherein the respective heads arranged on the first adhesive element and the second adhesive element form the detachable connection.

2. The sanding device as recited in claim 1, wherein the projections of the first adhesive element and/or the second adhesive element are designed to be at least partially elastic.

3. The sanding device as recited in claim 1, wherein the projections of the first adhesive element and/or the projections of the second adhesive element are identical to each other.

4. The sanding device as recited in claim 1, wherein the projections of the first adhesive element and/or the projections of the second adhesive element are identical.

5. The sanding device as recited in claim 1, wherein the projections of the first adhesive element and/or the projections of the second adhesive element are uniformly distributed.

6. The sanding device as recited in claim 1, wherein the distance that separates the projections of the first adhesive elements from each other is the same as the distance that separates the projections of the second adhesive elements from each other.

7. The sanding device as recited in claim 1, wherein the first adhesive element and the second adhesive element are made of the same material.

8. The sanding device as recited in claim 1, wherein the first adhesive element is detachably connected with the receiving body.

9. The sanding device as recited in claim 1, wherein the receiving body includes a sanding disk on which the first adhesive element is formed.

10. The sanding device as recited in claim 1, wherein the sanding disk is detachably connected with a main body of the receiving body.

* * * * *